Patented Sept. 18, 1934

1,974,024

UNITED STATES PATENT OFFICE 1,974,024

MANUFACTURE OF FILMS CONTAINING CELLULOSE ACETATE

Henry James Hands, London, England, assignor to Spicers Limited, London, England, a British company No Drawing. Application June 3, 1930, Serial No. 459,118. In Great Britain December 30, 1929

6 Claims. (Cl. 106—40)

This invention consists of improvements in or relating to the manufacture of films containing cellulose acetate.

In the past transparent films have been made from a variety of jelly-like or syrup-like substances such as solutions of gelatine, solutions of viscose, solutions of nitrocellulose and the like, but of recent years and for many purposes it has been found advantageous to manufacture films of various kinds from a solution containing cellulose acetate. One reason for its popularity is the fact that the finished film still contains its cellulose content in the form of cellulose acetate and is therefore substantially non-inflammable. However, for particular purposes such as photographic films, and especially the manufacture of films intended to carry a colour screen, special properties in the film may be required. In particular it is necessary for photographic work, e. g. for cinematographic work and colour cinema work:

(1) that the film should be of uniform quality and readily reproducible to a definite standard;

(2) that the properties of the film should be permanent;

(3) that the film should not be subject to cockling, hardening or cracking;

(4) that the film should be readily adapted to receive and retain the coatings or other applications necessary for photographic purposes;

(5) that any agents added to the basic materials should not tend to decompose these basic materials; and (6) that any added agents should be readily available in a form suitable for practical use in the film factory.

The object of this invention is to provide means for fulfilling these requirements.

As plasticizers and/or high boiling point solvents in compositions containing cellulose acetate there have been various proposals for the employment of mixed aryl esters of phosphoric acid, that is to say esters of the kind in which a plurality of different aryl groups, for instance both the phenyl and cresyl groups, are linked to a single phosphoric acid radicle.

I have now found that specially advantageous results can be obtained by using as plasticizers in cellulose acetate compositions employed in the manufacture of films those mixed organic derivatives of phosphoric acid in which the substituent organic groups comprise at least two different phenyl or poly-phenyl groups and in which one of the substituent groups contains a naphthyl radicle. The term "mixed aryl compounds (or derivatives) of phosphoric acid" as employed herein describes those derivatives having at least two unlike aryl groups. The bodies in question include:

Mono beta naphthyl di meta cresyl phosphate,
Di beta naphthyl mono meta cresyl phosphate,
Mono beta naphthyl di phenyl phosphate.

One or more of the above-mentioned phosphates free from excess acid and free from unconverted aromatic hydroxy compounds is employed.

Compositions containing cellulose acetate with one or more of the plasticizers above referred to may also contain other added agents, solvents, etc. including those mentioned in Serial No. 151,262.

The proportion of the aryl phosphate containing the naphthyl group is generally 20-30% by weight on the cellulose acetate.

If desired films may be produced from such compositions in apparatus of the general type referred to in Serial Nos. 238,150 and 300,932 and Patent No. 1,666,377. The last-mentioned process may be employed in the manufacture of films having layers differing in mechanical and physical properties and consists in applying in succession a plurality of compositions containing volatile solvent to a support from which the final product is stripped.

If such a process is used the nature and/or proportions of the phosphate constituents may be different in the various compositions.

The tri-substituted phosphates containing a naphthyl radicle are commercially obtainable compounds but if desired they may be prepared by the general method for the preparation of organic phosphates described in Watt's Dictionary of Chemistry by Muir and Morley, 1907 edition, vol. 4, page 75 with reference to the preparation of triphenyl phosphate. Thus for example in the preparation of diphenyl mono-naphthyl phosphate, molecular-weight proportions of phenol and naphthol, two of the former to one of the latter, are treated with phosphorus oxychloride (or phosphorus trichloride) as described for the preparation of triphenyl phosphate, the product is thoroughly washed with NaOH, and purified by distillation in vacuo or under reduced pressure.

The phosphates containing a naphthyl radicle are viscous oils and remain in the liquid state over a wide range of temperature, and do not sublime or evaporate or solidify or tend to solidify under the conditions of manufacture or use of the cellulose plastic in which they are incorporated. Further, films containing phosphates having a naphthyl radicle as plasticizers exhibit improved adhesion for gelatine emulsions. Phosphates containing a naphthyl radicle have also the advantage of being odourless and of imparting no colour to a transparent photographic film. They also exhibit the property of reducing the inflammability of cellulose ester compositions in which they are incorporated. Because of their greater power of reducing inflammability and their lower solidifying temperature, the phosphates containing a single naphthyl group are much preferred over the phosphates containing two naphthyl groups.

Mixtures of phosphates having a naphthyl radicle may be used instead of the single compounds as plasticizing agents.

The following is an example of three compositions suitable for the manufacture of films and embodying this invention:—

|  | 1 | 2 | 3 |
|---|---|---|---|
| Cellulose acetate | 100 | 100 | 100 |
| Mono-beta-naphthyl di-phenyl phosphate | 20 | 22 | 16 |
| Mono-beta-naphthyl di-cresyl phosphate | 4 | 2 | 4 |
| Tricresyl phosphate | 4 | 5 | 6 |
| Chlorinated hydrocarbons e. g. heptachloro-propane | 2.5 to 4 | 2.5 to 4 | 2.5 to 4 |

A suitable antacid and the usual solvents are added in each case together with 0.3 grams of resorcinyl diacetate.

I claim:

1. A cellulose ester plastic containing a plasticizer which comprises mono-beta-naphthyl di-phenyl phosphate.

2. A cellulose ester plastic containing a plasticizer which comprises mono-beta-naphthyl di-cresyl phosphate.

3. A cellulose ester plastic containing a plasticizer which includes a naphthyl, cresyl derivative of phosphoric acid.

4. A cellulose acetate film containing a plasticizer comprising a mono-beta-naphthyl di-meta-cresyl phosphate.

5. A cellulose acetate film containing a plasticizer comprising a mono-beta-naphthyl di-phenyl phosphate.

6. A composition adapted for the manufacture of films and containing cellulose acetate, mono-beta-naphthyl di-phenyl phosphate and mono-beta-naphthyl di-cresyl phosphate.

HENRY JAMES HANDS.